United States Patent
Bichot et al.

(10) Patent No.: US 11,973,814 B2
(45) Date of Patent: Apr. 30, 2024

(54) METHOD AND CONTROLLER FOR AUDIO AND/OR VIDEO CONTENT DELIVERY

(71) Applicant: BROADPEAK, Cesson Sevigne (FR)

(72) Inventors: Guillaume Bichot, Cesson Sevigne (FR); Pierre-Jean Guery, Cesson Sevigne (FR); Vincent Richard, Cesson Sevigne (FR); Nicolas Le Scouarnec, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 0 days.

(21) Appl. No.: 18/034,997

(22) PCT Filed: Nov. 9, 2021

(86) PCT No.: PCT/EP2021/081053
§ 371 (c)(1),
(2) Date: May 2, 2023

(87) PCT Pub. No.: WO2022/101176
PCT Pub. Date: May 19, 2022

(65) Prior Publication Data
US 2023/0403313 A1    Dec. 14, 2023

(30) Foreign Application Priority Data

Nov. 13, 2020 (EP) .................................. 20306377

(51) Int. Cl.
*H04L 65/61* (2022.01)
*H04L 65/75* (2022.01)
*H04L 65/80* (2022.01)

(52) U.S. Cl.
CPC ............ *H04L 65/61* (2022.05); *H04L 65/765* (2022.05); *H04L 65/80* (2013.01)

(58) Field of Classification Search
CPC ....... H04L 65/61; H04L 65/765; H04L 65/80; H04L 67/568
See application file for complete search history.

(56) References Cited

U.S. PATENT DOCUMENTS

2002/0007413 A1   1/2002 Garcia-Luna-Aceves et al.
2002/0065899 A1   5/2002 Smith et al.
(Continued)

FOREIGN PATENT DOCUMENTS

EP           3905708 A1 *  3/2021

OTHER PUBLICATIONS

Richard Bradbury BBC, "TM-IPI3378_ABR Multicast Taskforce—Technical specification.docx;" DVB, Digital Video Broadcasting; Oct. 4, 2019; pp. 13-18; No. 6; Retrieved from the Internet: URL:https://member.dvb.org/wg/TM-IPI/documentRevision/download/42982 TM-IPI3378_ABR Multicast Taskforce—Technical specification.zip ABR Multicast Taskforce—Technical specification—Preview Oct. 4, 2019 MARKUP.pdf; XP017858422.
(Continued)

*Primary Examiner* — Jungwon Chang
(74) *Attorney, Agent, or Firm* — Williams Mullen; R. Brian Drozd (57) ABSTRACT

A method for delivering an audio and/or video content using adaptive streaming to a terminal, the audio and/or video content being segmented into data segments available in various representations with respective audio and/or video qualities, the representations being time-aligned per segment, the segments being further divided into chunks, a controller selects, from a set of candidate caching platforms, the caching platform to be used to deliver the audio and/or video content to the terminal, as a function of a minimum burst transfer duration compared with the chunk duration as defined by an origin server providing the audio and/or video
(Continued)

content. The controller redirects the terminal to the selected platform for further delivery of the audio and/or video content in the form bursts of chunks in response to requests for segments.

14 Claims, 5 Drawing Sheets

(56) References Cited

U.S. PATENT DOCUMENTS

| | | | |
|---|---|---|---|
| 2009/0172167 A1 | 7/2009 | Drai et al. | |
| 2015/0100667 A1 | 4/2015 | Freyria et al. | |
| 2015/0215396 A1* | 7/2015 | Puthalath | H04L 45/121 |
| | | | 709/216 |
| 2015/0229685 A1* | 8/2015 | Brebion | H04L 65/102 |
| | | | 709/202 |
| 2018/0041561 A1* | 2/2018 | Davies | H04L 65/762 |
| 2022/0337888 A1* | 10/2022 | Soman | H04L 65/762 |
| 2022/0385717 A1* | 12/2022 | Wang | H04N 21/2404 |

OTHER PUBLICATIONS

Feb. 8, 2022 Search Report issued in International Patent Application No. PCT/EP2021/081053.

Feb. 8, 2022 Written Opinion of the International Searching Authority issued in International Patent Application No. PCT/EP2021/081053.

* cited by examiner

METHOD AND CONTROLLER FOR AUDIO AND/OR VIDEO CONTENT DELIVERY

TECHNICAL FIELD

The present invention generally relates to delivering an audio and/or video content to a client device, or terminal, via a network infrastructure.

RELATED ART

In HTTP ("Hypertext Transfer Protocol") adaptive streaming, a client device (or terminal) interacts with a server equipment for requesting parts, referred to as segments, of an audio and/or video stream (live content) or file (Video On-Demand content) to be played out. The audio and/or video stream or file is encoded in several qualities, referred to as representations. Each of the representations is composed of a succession of segments of equal duration with respect to the audio and/or video content. The representations are therefore time-aligned per segment and start with the same audio and/or video reference frame, thus enabling the client device (or terminal), and more particularly an audio and/or video player included therein, switching from one representation to another representation on segment boundaries.

In adaptive streaming technology such as HLS (standing for "HTTP Live Streaming", which is a live streaming communications protocol based on HTTP and developed by Apple Inc.) or DASH (standing for "Dynamic Adaptive Streaming over HTTP", which is a multimedia streaming technology developed by the Moving Picture Experts Group (MPEG)), switching from one representation to another representation is driven by the client device (or terminal), meaning that the client device (or terminal) requests the server equipment to switch to said another representation. Typically, the client device (or terminal) selects appropriate representation based on estimation of available bandwidth from the server equipment to the client device (or terminal) and potentially other criteria like buffer occupancy, screen resolution, decoder capabilities, . . . .

Emerging low latency technologies for live streaming such as CTE (Chunked Transfer Encoding) with MPEG CMAF (Common Media Application Format) or LL HLS (Low Latency HLS) enable early playback of audio and/or video contents by particular chunks management that don't need availability of a full segment before starting playback.

Thus, in a Content Delivery Network (CDN) deployment for adaptive streaming, an originating server (also referred to as origin server) acting as a packager equipment provides the representations in the form of segments split into chunks ready to be sent whenever the related segment is requested by a cache server or caching platform. The chunks correspond to a predefined duration, referred to as chunk duration, of the audio and/or video content and are thus smaller encoded units than the segments. The cache server or caching platform serves the client device (or terminal) upon receiving segment requests therefrom, by delivering chunks in burst transfers.

Although these low latency technologies speed up data delivery, they create disturbances when estimating available bandwidth. Inappropriate audio and/video content representation (quality) may consequently be selected and thus QoE may be lowered.

Throughput from the cache server to the client device (or terminal) may be constrained by either link capacity from the cache server to the client device (or terminal) or by Round Trip Time (RTT) between the cache server, or caching platform, and the client device (or terminal).

Let's consider an illustrative example as follows. A video content is made available in three representations, with corresponding bitrates of 4 Mbps, 2 Mbps and 1 Mbps. The video content is divided into segments having a duration of 2 seconds with respect to the video content, and further divided into chunks of duration of 200 milliseconds with respect to the video content (10 chunks per segment). Let's consider an RTT of 150 milliseconds and a maximum bottleneck bandwidth of 8 Mbps. The client device (player) having requested a 1 Mbps video segment for example according to the MPEG DASH technology, the video content is delivered chunk after chunk, which leads to a bandwidth estimation of roughly between 1.5 and 2.5 Mbps, although effective capacity equals 8 Mbps. It may be noted here that, according to some low latency technologies such as in one operational mode of LL HLS technology, the client device (player) may transmit requests on a per-chunk basis instead of on a per-segment basis, but bandwidth estimation and effective capacity figures remain the same.

It means that the client device (or terminal) or the cache server (or caching platform) that is trying to assess the maximum available bandwidth though analyzing the quantity of bits transmitted during a burst period corresponding to transmission of a chunk wrongly estimates between 1.5 and 2.5 Mbps of available bandwidth, far below real available bandwidth, precluding usage of higher quality representations (having higher bitrate). The situation is certainly even worse than what is shown in the foregoing example because splitting a segment in chunks of equal duration with respect to the audio and/video content does not lead to chunks with equal size (i.e., quantity of bits). Indeed, considering a video content, a chunk including I picture data (according to conventional IPB compression scheme) is certainly of a greater size than average size of 200 kbits used in the foregoing example to estimate the available bandwidth, whereas other chunks including other data of the same video frame are of a lower size. Depending on which chunks are considered in the congestion time window for estimating available bandwidth, it may lead to an even more reduced available bandwidth estimation, which may also be amplified when there is network buffering between the cache server (or caching platform) and the client device (or terminal).

It can further be noted that when the RTT is different, the resulting available bandwidth estimation is different; for example, with a RTT equal to 10 milliseconds, it would have resulted in a theoretical bandwidth estimation of 20 Mbps, which is indeed bounded by the maximum bottleneck bandwidth of 8 Mbps (link capacity).

It is thus desirable to appropriately selecting/deploying a cache server for delivering an audio and/or video content to a terminal which can rely on the RTT estimation performed with respect to said terminal so as to improve QoE.

It is thus desirable to overcome the foregoing drawbacks of the prior art, and more particularly to improve QoE when delivering an audio and/or video content from a server equipment to a client device (or terminal) using adaptive bit rate. It is also particularly desirable to provide a solution that is simple to implement and that is cost-effective.

SUMMARY OF THE INVENTION

To that end, it is disclosed herein a method for delivering an audio and/or video content to a terminal using adaptive streaming by an audio and/or video content delivery system deployed on top of a network infrastructure, the audio and/or video content delivery system comprising a controller and a plurality of caching platforms, the audio and/or video content being segmented into data segments available in various representations with respective audio and/or video qualities, the representations being time-aligned per segments further divided into chunks having same chunk duration with respect to the audio and/or video content. The method comprises the following steps performed by the controller, for each caching platform: obtaining a physical round-trip time information pertaining to the caching platform in question with respect to delivering audio and/or video contents by the caching platform in question to terminals via the network infrastructure; computing a minimum burst transfer size mTBS from the maximum average bitrate of the various representations of the audio and/or video content and from the obtained physical round-trip time information; computing a minimum burst transfer duration mTBDi, for one or more representations i of the audio and/or video content, from the minimum burst transfer size mTBS. And when the audio and/or video content has to be delivered to the terminal, the method comprises the following steps performed by the controller: selecting, from a set L0 of candidate caching platforms, the caching platform to be used to deliver the audio and/or video content to the terminal, as a function of the minimum burst transfer duration mTBDi computed for one or more representations i of the audio and/or video content; and redirecting the terminal to the selected platform for further delivery of the audio and/or video content in the form of bursts of chunks. Furthermore, for selecting the caching platform to be used, the controller performs: forming a list L1, from the set L0 of candidate caching platforms, containing the caching platforms that exhibit a minimum burst transfer duration mTBDi for one or more representations of the i of the audio and/or video content which is lower or equal to the chunk duration applicable to the delivery of the audio and/or video content in question, and when the cardinality of the list L1 is above a predefined threshold, selecting the caching platform to be used from the list L1; and otherwise forming a list L2, from the set L0 of candidate caching platforms, containing the caching platforms that exhibit a minimum burst transfer duration mTBDi lower or equal to a predefined threshold TH that is a multiple of the chunk duration applicable to the delivery of the audio and/or video content in question, and selecting the caching platform to be used from the list L2. By thus selecting the caching platform to be used, QoE is improved since bandwidth estimation is more reliable when delivering the audio and/or video content to the terminal using adaptive bit rate.

According to a particular embodiment, the physical round-trip time information represents maximum of minimum round-trip time incurred in past history when delivering an audio and/or video content to terminals and/or average of minimum round-trip time incurred in past history when delivering an audio and/or video content to terminals.

According to a particular embodiment, the controller computes, for each caching platform, the minimum burst transfer duration mTBDi only for the lowest bitrate representation available for the one or more audio and/or video contents, namely for i=1.

According to a particular embodiment, the controller selects the caching platform to be used to deliver the audio and/or video content to the terminal when processing a session request concerning the terminal in question and the audio and/or video content in question.

According to a particular embodiment, the chunk duration, as well as available representations of the audio and/or video content, depend on an origin server providing the audio and/or video content concerned by the session request, and the controller retrieves an identifier representing the origin server in question by analysing a Uniform Resource Identifier path indicated in the session request, or copied or quoted therefrom.

According to a particular embodiment, the controller defines said set L0 of candidate caching platforms as being the caching platforms of the audio and/or video content delivery system which are deployed or which can be activated in a predetermined geographical area.

According to a particular embodiment, the network infrastructure is a mobile network infrastructure, and the geographical area is determined as being a part of the network infrastructure upstream a predetermined set of mobile network cells surrounding the terminal.

According to a particular embodiment, when the cardinality of the list L2 is lower or equal to a predefined threshold, the controller selects the caching platform to be used from the list L0.

According to a particular embodiment, the controller performs: withdrawing from the list L0 caching platforms not meeting at least one predefined criterion; selecting the lowest representation, designated here with a parameter y=1; performing a caching platform selection round by considering the minimum burst transfer duration mTBDi for i=y by forming the list L1 and potentially the list L2; and when no selection results from the lists L1 and L2, the parameter y is incremented by one unit and the controller performs another caching platform selection round with the minimum burst transfer duration mTBDi for the representation designated by the parameter y.

According to a particular embodiment, the controller redirects the terminal toward the selected caching platform by forcing the terminal to submit again a session request but by querying the selected caching platform instead of querying the controller.

According to a particular embodiment, the network infrastructure is a mobile network infrastructure and the caching platforms are deployed in cloudlets of the mobile network infrastructure.

It is further disclosed herein a computer program product comprising program code instructions that can be loaded in a programmable device for implementing the foregoing method in any one of its embodiments, when the program code instructions are run by the programmable device. It is further disclosed herein an information storage medium storing such a computer program.

It is further disclosed herein a controller intended for being used in an audio and/or video content delivery system deployed on top of a network infrastructure, the audio and/or video content delivery system further comprising a plurality of caching platforms for delivering an audio and/or video content via the network infrastructure, the audio and/or video content being segmented into data segments available in various representations with respective audio and/or video qualities, the representations being time-aligned per segments further divided into chunks having same chunk duration with respect to the audio and/or video content. The controller comprises electronic circuitry configured for, for each caching platform: obtaining a physical round-trip time information pertaining to the caching platform in question with respect to delivering audio and/or video contents by the caching platform in question to terminals via the network infrastructure; computing a minimum burst transfer size mTBS from the maximum average bitrate of the various representations of the audio and/or video content and from the obtained physical round-trip time information; computing a minimum burst transfer duration mTBDi, for one or more representations i of the audio and/or video content, from the minimum burst transfer size mTBS. And the electronic circuitry is further configured, when the audio and/or video content has to be delivered to the terminal, for: selecting, from a set L0 of candidate caching platforms, the caching platform to be used to deliver the audio and/or video content to the terminal, as a function of the minimum burst transfer duration mTBDi computed for one or more representations i of the audio and/or video content; and redirecting the terminal to the selected platform for further delivery of the audio and/or video content in the form of bursts of chunks. Furthermore, the electronic circuitry is configured, so as to select the caching platform to be used, for: forming a list L1, from the set L0 of candidate caching platforms, containing the caching platforms that exhibit a minimum burst transfer duration mTBDi for one or more representations i of the audio and/or video content which is lower or equal to the chunk duration applicable to the delivery of the audio and/or video content in question, and when the cardinality of the list L1 is above a predefined threshold, selecting the caching platform to be used from the list L1; and otherwise forming a list L2, from the set L0 of candidate caching platforms, containing the caching platforms that exhibit a minimum burst transfer duration mTBDi lower or equal to a predefined threshold TH that is a multiple of the chunk duration applicable to the delivery of the audio and/or video content in question, and selecting the caching platform to be used from the list L2.

It is further disclosed herein a Content Delivery Network including the foregoing controller.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF AT LEAST ONE EMBODIMENT

Figure 1:
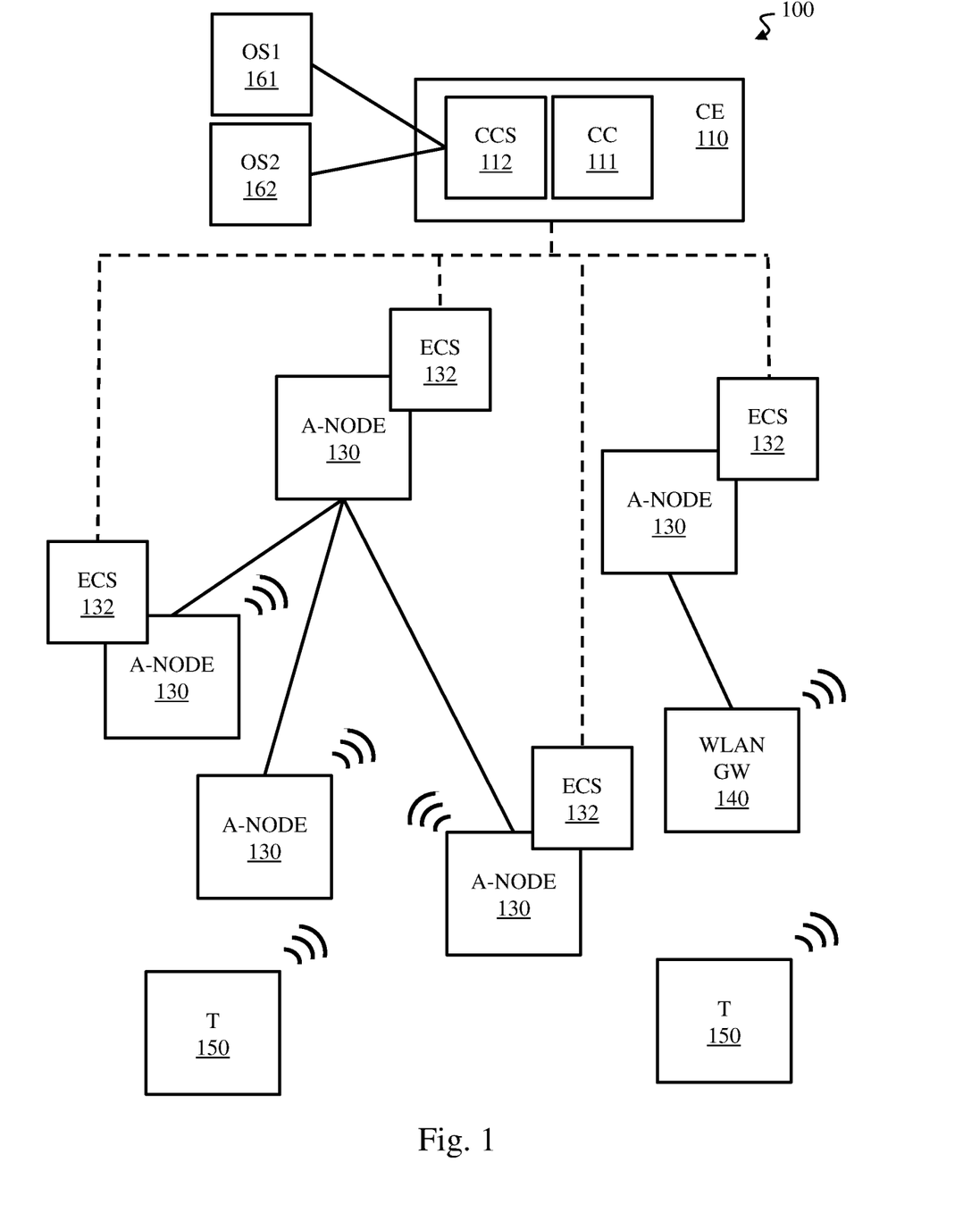
FIG. 1 schematically represents an audio and/or video content delivery system in which the present invention may be implemented.

FIG. 1 schematically represents an audio and/or video content delivery system 100 deployed on top of a network infrastructure.

The audio and/or video content delivery system 100 is preferably a Content Delivery Network (CDN).

The network infrastructure is for instance, as illustratively depicted in FIG. 1, a mobile network infrastructure, for example in compliance with LTE (Long-Term Evolution) 4G or 5G.

The audio and/or video content delivery system 100 comprises caching platforms spread over the network infrastructure, i.e., at various locations in the network infrastructure. The caching platforms are controlled by a controller, illustratively a central controller CC 111 in FIG. 1. The caching platforms are hierarchically arranged, using a central caching platform as root.

In the scope of the illustrative mobile network infrastructure in FIG. 1, the caching platforms are named edge cache servers ECS 132.

The edge cache servers ECS 132 aim at transmitting segments of audio and/or video contents to terminals T 150 (also referred to as client devices), i.e., mobile terminals T 150 illustratively in FIG. 1, which are connected to the network infrastructure. The terminals T 150 may thus access the mobile network infrastructure via base stations, eNodeBs, but may also access the mobile network infrastructure via wireless local area networks (WLAN) connected thereto, such as Wi-Fi hotspots, for instance provided by WLAN gateways 140.

The network infrastructure comprises aggregation nodes (each one being labelled A-NODE 130 in FIG. 1). Such aggregation nodes are base stations, central offices, eNodeBs, Packet data network GateWays (P-GWs) or Serving GateWays (S-GWs), Terminating User Plane Functions (TUPFs), depending on network infrastructure technology in use. At least some of the aggregation nodes 130 of the mobile network infrastructure implement a breakout function, for instance using MEC-based platforms.

Each edge cache server ECS 132 is connected to the breakout function of an aggregation node 130 of the mobile network infrastructure. Any aggregation node 130 to which is connected an edge cache server ECS 132 implements a configurable breakout function that allows routing packets, typically IP (Internet Protocol) packets, through the breaking function according to configurable routing rules. Such routing rules may define that packets with such or such destination address and/or such or such source address have to be routed to the edge cache server ECS 132 in question. The breakout function further allows the edge cache server ECS 132 connected thereto to transmit packets via the network infrastructure.

Logically the edge cache servers ECS 132 are interconnected using a tree topology or a star topology, thus being hierarchically arranged, wherein a central content server CCS 112 in a central equipment CE 110 is the root of the topology. It means that, when an audio and/or content delivery session for a given terminal T 150 cannot be processed by the closest edge cache servers ECS 132 in the network infrastructure with respect to the terminal T 150 in question, the audio and/or content delivery session is processed by a more distant one (closer to the root) cache server upstream in the topology of the audio and/or video content delivery system 100 (and in the network infrastructure).

The central content server CCS 112 may be a single server or a cluster of servers. The central content server CCS 112 obtains the audio and/or video contents from at least one origin server. On FIG. 1, two origin servers OS1 161 and OS2 162 are shown. Illustratively the origin server OS1 161 and the origin server OS2 162 belong to distinct content providers. The chunk size in use for the audio and/or video contents is imposed by the content providers, which means that the central content server CCS 112 does not have any means for modifying the chunk size, since the origin server OS1 161, the origin server OS2 162 and the central content server CCS 112 are typically governed by different organizations. Moreover, the size of the chunks provided by the origin server OS1 161 may be different than the size of the chunks provided by the origin server OS2 162. Note that in FIG. 1, the central cache server CCS 112 plays the role of a shield cache. Alternatively, the origin servers OS1 161 and OS2 162 could feed the edge content servers ECS 132 directly.

The edge cache servers ECS 132 are fed with audio and/or video contents by the origin server OS1 161 and/or the origin server OS2 162, through the central content server CCS 112 or not. The origin servers OS1 161 and OS2 162, the central content server CCS 112 and the edge cache servers ECS 132 apply adaptive streaming. The central content server CCS 112 may transmit adaptive streaming segments of the audio and/or video contents in question to the edge cache servers ECS 132 using broadcast, multicast or unicast transmissions.

The origin servers OS1 161 and OS2 162 are in charge of packaging at least one audio and/or video content to be delivered to the terminals T 150 in the form of segments divided into chunks providing each audio and/or video content in plural representations (qualities) having respective bitrates, in order to implement adaptive streaming.

Figure 2:
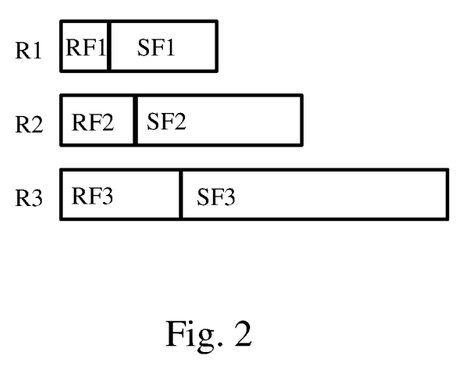
FIG. 2 schematically represents time-aligned segments of various representations.

As disclosed hereafter with respect to FIG. 2, the higher the quality of a representation, the higher the corresponding bitrate. Segments are time-aligned between all representations of any one said audio and/or video content, thus enabling switching from one representation to another depending on which representation bitrate better suits to available bandwidth estimation so as to achieve best QoE as possible.

The chunks are of equal duration with respect to the audio and/or video content. The chunk duration is a configuration parameter of the origin servers OS1 161, OS2 162 and therefore, as already explained, is typically out of control of the audio and/or video content delivery system 100. The chunk duration is a fixed value ranging between, e.g., 40 milliseconds (the minimum chunk duration when dealing with 25 frame/seconds video stream) and 500 milliseconds of audio and/or video content if the segment duration is, e.g., 1 second (a segment duration must correspond to an integer number of chunk duration).

The edge cache servers ECS 132 serve the terminals T 150 upon receiving requests (per-segment request or per-chunk requests) therefrom, by delivering the chunks in burst transfers.

Each terminal T 150 comprises a player and a decoder. The decoder is configured (initialized or reinitialized) by the player according to encoding format and quality (i.e., representation) effectively in use and is in charge of decoding in accordance audio and/or video data received by the player. The player is in charge of performing exchanges with a caching platform so as to receive the encoded audio and/or video data from said caching platform. The player requests segments of at least one audio and/or video content, or chunks thereof, and the caching platform transmits in return the chunks of the requested segments, or the requested chunks.

Considering a session for delivering an audio and/or video content to one said terminal T 150, available bandwidth estimation is performed by the caching platform delivering the audio and/or video content to said terminal T 150 and/or by said terminal T 150. Available bandwidth estimation enables selecting one representation of the audio and/or video content depending on which representation bitrate better suits to the available bandwidth estimation so as to achieve best QoE as possible. For example, available bandwidth estimation is performed by using BBR (Bottleneck Bandwidth and Round-trip propagation time) information. BBR approach is a recent congestion control algorithm that is particularly well suited to wireless communication and that can be used in association with the TCP protocol or other transport protocol (e.g., QUIC over UDP (User Datagram Protocol)). Alternative embodiments where available bandwidth estimation is made using other congestion control algorithms such as in TCP CUBIC, VEGAS, RENO or in other transport protocols such as QUIC, SCTP (Stream Control Transmission Protocol) . . . are possible. Alternatively, the available bandwidth estimation is directly performed by analyzing transport protocol traffic shape (data packets and acknowledge packets) of at least one transport connection (e.g., TCP connection) used to deliver the chunks to the terminal T 150 in question.

As shown in FIG. 2, each audio and/or video content is made available in various representations R1, R2, R3, with respective audio and/or video qualities. One segment of any and all representations (e.g., R1) of the audio and/or video content contains the same content part as the same segment of any and all other representations (e.g., resp. R2, R3) of the audio and/or video content. In other words, the segments of the various representations R1, R2, R3 are time-aligned. Each segment starts with a reference frame RF. In FIG. 2, considering the same segment of the audio and/or video content, the reference frame RF is labelled RF1 for the representation R1, the reference frame RF is labelled RF2 for the representation R2 and the reference frame RF is labelled RF3 for the representation R3. Moreover, the reference frame RF is followed by at least one subsequent frame SF in the segment. In FIG. 2, the at least one subsequent frame SF is labelled SF1 for the representation R1, the at least one subsequent frame SF is labelled SF2 for the representation R2 and the at least one subsequent frame SF is labelled SF3 for the representation R3.

Since the representations R1, R2, R3 correspond to different qualities, the size of one segment of any and all representations (e.g., R1) typically differs from the size of the same segment of any and all other representations (e.g., resp. R2, R3). Indeed, segment size increases with quality, as shown in FIG. 2 where the same segment of the representations R1, R2, R3 is schematically represented, and where it is considered that the representation R3 corresponds to a better quality than the representation R2 and the representation R2 corresponds to a better quality than the representation R1. Consequently the size of the reference frame RF3 in the representation R3 is bigger than the size of the reference frame RF2 in the representation R2, and the size of the reference frame RF2 in the representation R2 is bigger than the size of the reference frame RF1 in the representation R1. In addition, the size of the subsequent frames SF3 in the representation R3 is bigger than the size of the subsequent frames SF2 in the representation R2, and the size of the subsequent frames SF2 in the representation R2 is bigger than the size of the subsequent frames SF1 in the representation R1. As a consequence, bandwidth requirements also increase with audio and/or video quality.

Figure 3:
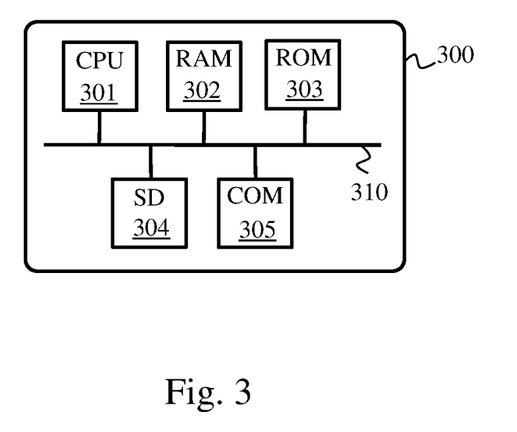
FIG. 3 schematically represents an example of hardware architecture of a device usable in the scope of the audio and/or video content delivery system.

FIG. 3 schematically represents an example of hardware architecture 300 usable in the scope of the audio and/or video content delivery system 100. The hardware architecture 300 may be part of a caching platform, such as edge cache server ECS 132. The hardware architecture 300 may be part of the central equipment CE 110, such as the central controller CC 111. The hardware architecture 300 may be part of terminal T 150.

The hardware architecture 300 comprises the following components interconnected by a communications bus 310: a processor, microprocessor, microcontroller or CPU (Central Processing Unit) 301; a RAM (Random-Access Memory) 302; a ROM (Read-Only Memory) 303, such as an EEPROM (Electrically Erasable Programmable ROM), for example a Flash memory; a HDD (Hard-Disk Drive), or any other device adapted to read information stored on a storage medium, such an SD (Secure Digital) card reader 304; at least one communication interface COM 305.

CPU 301 is capable of executing instructions loaded into RAM 302 from ROM 303 or from an external memory, such as HDD 304 or an SD card. After the hardware architecture 300 has been powered on, CPU 301 is capable of reading instructions from RAM 302 and executing these instructions. The instructions form one computer program that causes CPU 301 to execute the steps performed disclosed herein with respect to the caching platforms, or to the central equipment CE 110 or to the terminals T 150.

Thus, the steps and algorithms described herein may be implemented in software form by execution of a set of instructions or program by a programmable computing machine, such as a PC, a DSP (Digital Signal Processor) or a processor; or else implemented in hardware form by a machine or a dedicated component, chip or chipset, such as an FPGA (Field-Programmable Gate Array) or an ASIC (Application-Specific Integrated Circuit). More generally, the caching platforms, the central equipment CE 110, and the mobile terminals T 150 comprise electronic circuitry configured to perform the steps and algorithms described herein with respect to the device or equipment in question.

Figure 4:
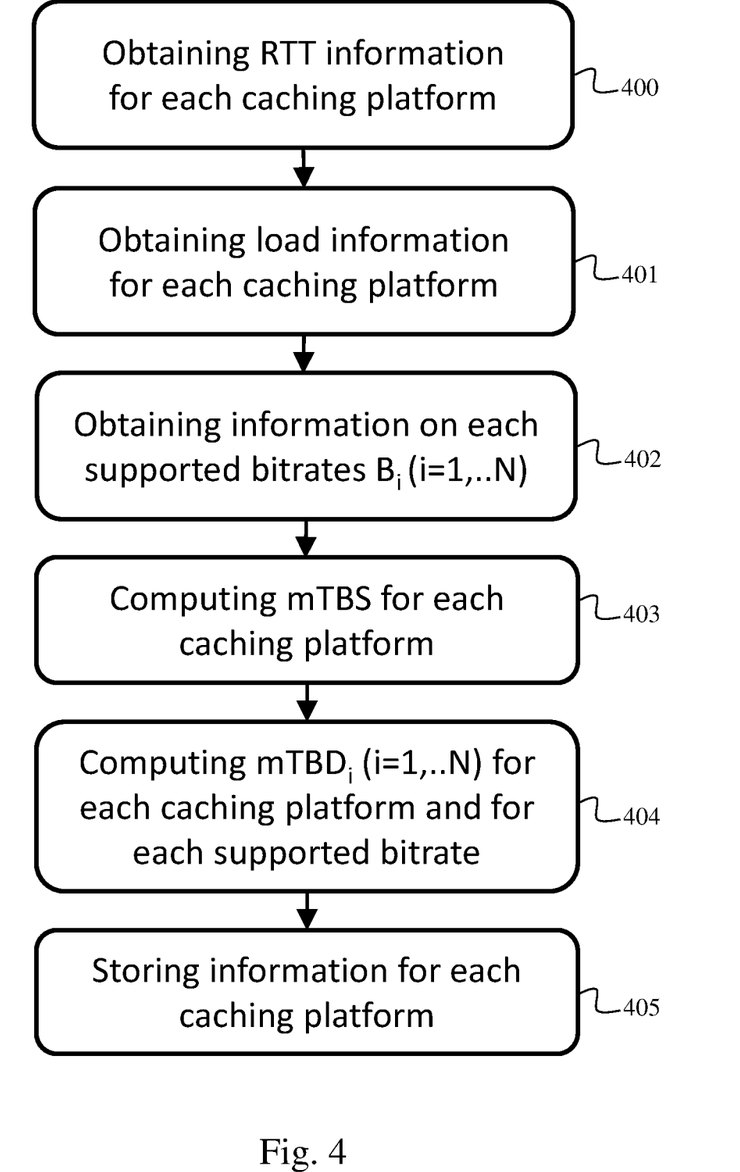
FIG. 4 schematically represents an algorithm for obtaining and storing information usable for selecting appropriate caching platform for later on delivering an audio and/or video content.

FIG. 4 schematically represents an algorithm for obtaining and storing information usable for selecting an appropriate caching platform for later on delivering one or more audio and/or video contents using adaptive streaming. The one or more audio and/or video contents must be delivered in low latency and as such is preferably a live content.

In a step 400, the central controller CC 111 obtains physical RTT (round-trip time) information from each caching platform. Physical RTT means RTT that is not incurred by a traffic overload but incurred by the physical path, typically related to distance (e.g., wire length) and switch/router processing time. Physical RTT information from each caching platform corresponds to expected RTT between said caching platform and terminals T 150 to which said caching platform may deliver an audio and/or video content (i.e., RTT expected to be incurred when a terminal T 150 obtains delivery of the audio and/or video content from said caching platform). Physical RTT information is maximum (greatest value) of minimum RTT incurred in past history when delivering an audio and/or video content to terminals T 150 and/or average of minimum RTT incurred in past history when delivering an audio and/or video content to terminals T 150.

In an optional step 401, the central controller CC 111 obtains load information from each caching platform. Load information indicates resources occupancy relatively to the caching platform. Load information is for instance percentage of processing and/or memory resources in use in the caching platform. Load information is for instance amount of available processing and/or memory resources in the caching platform. Load information is for instance amount of remaining sessions which can still be accepted by the caching platform.

The steps 400 and 401 are performed by transmissions of messages between the caching platforms (i.e., the edge cache servers ECS 132 in FIG. 1) and the central controller CC 111. Transmission of physical RTT information and/or load information may be initiated by the caching platforms, typically on a regular basis or when a particular event occurs. Transmission of physical RTT information and/or load information may be performed in response to requests from the central controller CC 111. Transmission of physical RTT information and/or load information may be jointly performed. Intermediate controllers may be used to ensure communications between the caching platforms and the central controller CC 111.

In a step 402, the central controller CC 111 obtains information on each representation bitrate to be supported for the one or more audio and/or video contents to be considered.

Available representation bitrates may differ from one audio and/or video content to another. In this case, the central controller CC 111 may execute the algorithm of FIG. 4 independently for each audio and/or video content.

Available representation bitrates may differ from one origin server to another. For instance, the audio and/or video content delivery system 100 operates for plural tenants or content providers. Each tenant or content provider (and their corresponding origin servers) provides audio and/or video contents in plural representations, meaning plural bitrates. The representation bitrates might differ from one tenant or content provider to another (e.g., premium content provider versus low-cost content provider). In this case, the central controller CC 111 may execute the algorithm of FIG. 4 independently for each tenant or content provider, so that the selection of appropriate caching platform for later on delivering an audio and/or video content is performed in a customized manner for each tenant or content provider.

Assuming N representations to be supported, each representation has an average bitrates $B_i$ ($i=1, \ldots, N$), wherein $i=1$ represents the lowest bitrate representation (lowest quality) and $i=N$ represents the highest bitrate representation (highest quality).

In a step 403, the central controller CC 111 computes, for each caching platform, a minimum burst transfer size mTBS, as a function of the physical RTT information obtained in the step 400 for said caching platform, as follows:

$$mTBS = C0 * B_N * \text{RTT}$$

wherein C0 is a (positive) constant adding a predefined margin that compensates potential approximation of RTT information. Definition of C0 depends on whether the caching platforms respond to per-chunk requests (like in one operational mode of the LL HLS technology) or whether the caching platforms respond to per-segment requests (like with MPEG DASH technology). C0 further compensates that $B_i$, including $B_N$, is an average bitrate indication (which means the effective bitrate may vary around this average bitrate indication). C0 may further compensate that the bandwidth estimation in use, in view of the adaptive streaming technology in use, may rely on effective RTT or on half this value. Indeed, with per-segment requests (like with MPEG DASH technology), the bandwidth estimation may rely on half RTT, whereas with per-chunk requests (like in one operational mode of the LL HLS technology), the bandwidth estimation may rely on RTT.

In a step 404, the central controller CC 111 computes, for each caching platform, a minimum burst transfer duration mTBDi, for each representation i (i=1, ..., N) supported, as follows:

$$mTBDi = mTBS/Bi$$

The minimum burst transfer duration mTBDi (i=1, ..., N) corresponds to the burst transfer duration that would be suitable for effective bandwidth estimation when delivering an audio and/or video content from the caching platform to a terminal T 150 considering the physical RTT information for said caching platform.

In a particular embodiment, the central controller CC 111 computes, for each caching platform, the minimum burst transfer duration mTBDi only for the lowest bitrate representation (i=1) available for the one or more audio and/or video contents.

In a step 405, the central controller CC 111 stores in memory, for each caching platform, the minimum burst transfer duration mTBDi computed in the step 404, then used later on by the central controller CC 111 in order to appropriately select one caching platform among the possible caching platforms for delivering an audio and/or video content, as disclosed hereafter with respect to FIG. 5.

The algorithm in FIG. 4 may be executed on a regular basis. The algorithm in FIG. 4 may be executed upon receiving an event indicating that physical RTT information from a caching platform has changed in some extent above a predefined threshold. The algorithm in FIG. 4 may be executed upon receiving an event indicating that a new caching platform is added to the audio and/or video content delivery system 100. The algorithm in FIG. 4 may be executed upon receiving an event indicating that audio and/or video delivery services have to be provided for a new tenant or content provider (and one or more corresponding new origin servers).

Load information can also be provided in a separate process. Load information update can be provided by the caching platforms to the central controller CC 111 when change in some extent above a predefined threshold occurs (for instance when 10% of total resources have been freed or allocated since last update).

The central controller CC 111 decides to select a caching platform to be used for delivering an audio and/or video content to a terminal T 150 when processing a session request for said terminal T 150. Said session request indicates that an audio and/or video content delivery session has to be newly managed (typically, a new audio and/or video content delivery session has to be put in place) and an appropriate caching platform has to be selected, and even potentially deployed (activated), in order to handle the audio and/or video content delivery session in question. For instance, the session request takes the form of a request for obtaining a manifest file or a playlist associated with an audio and/or video content. "Manifest file" is terminology used in MPEG DASH technology and "playlist" is terminology used in HLS technology. Manifest file or playlist gathers information about representations available for the audio and/or video content to which the session request refers, including chunk duration information (chunks being called partial segments according to the HLS terminology). Said session request may be directly received by the central controller CC 111 from the concerned terminal T 150. Said session request may be notified by one said caching platform to the central controller CC 111. Said session request may be notified to the central controller CC 111 by an edge controller of the audio and/or video content delivery system 100 which acts as an intermediate controller and locally manages one or more caching platforms.

Figure 5:
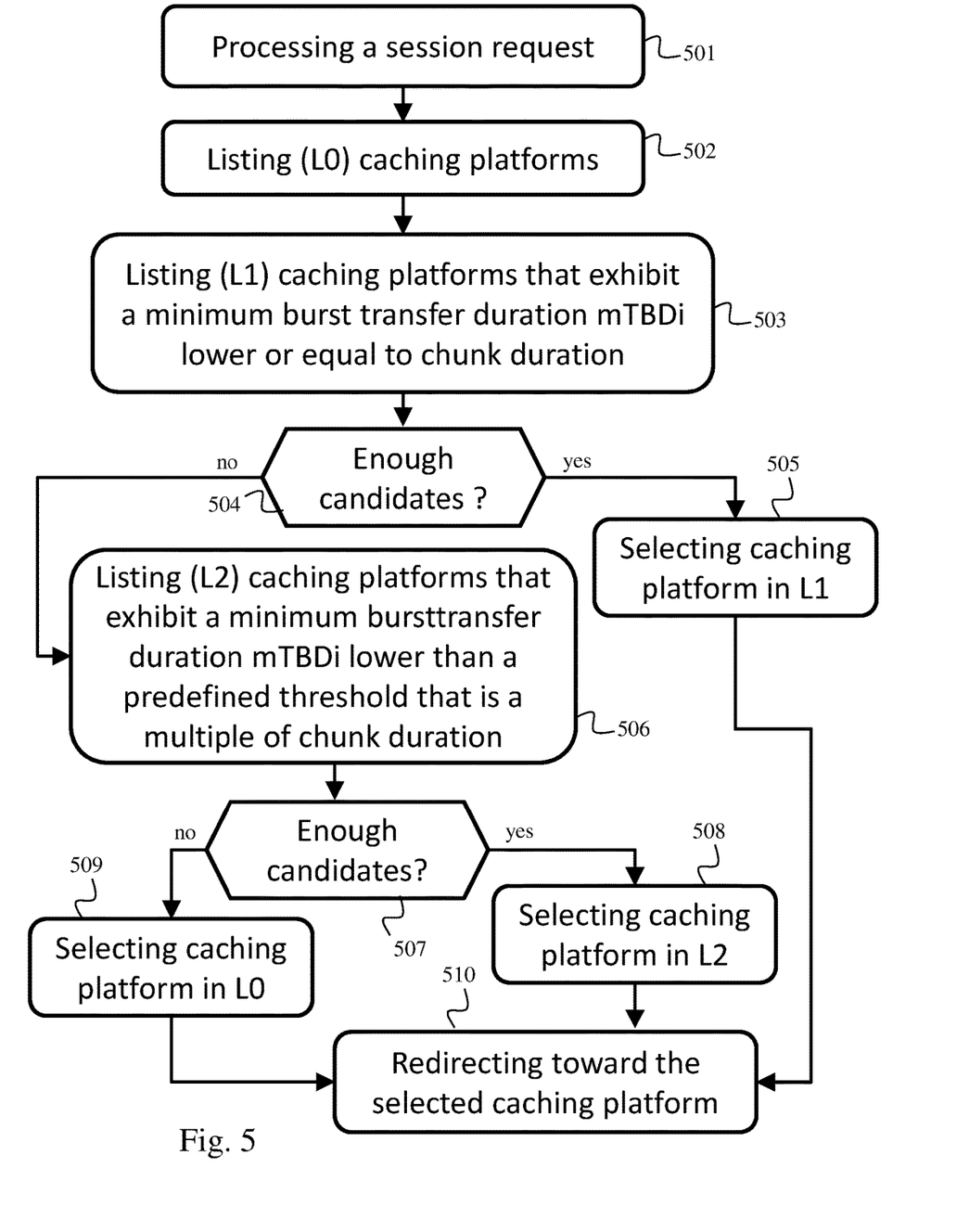
FIG. 5 schematically represents an algorithm for managing session requests in one embodiment.

FIG. 5 schematically represents an algorithm for managing session requests by the central controller CC 111, in one embodiment.

In a step 501, the central controller CC 111 processes a session request for a terminal T 150. As explained above, the session request is representative of a session to be setup with respect to said terminal T 150 so as to deliver thereto an audio and/or video content.

In a step 502, the central controller CC 111 lists available caching platforms that are capable of delivering the audio and/or video content to the terminal T 150. The central controller CC 111 thus forms a list L0 as a set of candidate caching platforms of the audio and/or video content delivery system 100, for delivering the audio and/or video content to the terminal T 150 in question. The central controller CC 111 may define said set of candidate caching platforms as being the caching platforms of the audio and/or video content delivery system 100 which are deployed or which can be activated (e.g., dynamical activation of a caching platform instance in an edge cloudlet) in a predetermined geographical area. For example, when the network infrastructure is a mobile network infrastructure, the cell in which the terminal T 150 is located is indicated in messages originating from the terminal T 150 in question, so that the central controller CC 111 is able to determine in which geographical area the terminal T 150 is located and therefore which caching platforms are capable of delivering the audio and/or video content to the terminal T 150. For example, the geographical area is determined as being a part of the network infrastructure upstream a predetermined set of mobile network cells surrounding the terminal T 150.

In a step 503, the central controller CC 111 lists, from the list L0, the caching platforms that exhibit a minimum burst transfer duration mTBDi, as stored according to the algorithm of FIG. 4, lower or equal to the chunk duration applicable to the delivery of the audio and/or video content in question. The central controller CC 111 thus forms a list L1 as a refined set of candidate caching platforms of the audio and/or video content delivery system 100, for delivering the audio and/or video content to the terminal T 150 in question. As already mentioned, the chunk duration, as well as available representations for adaptive streaming, depends on the tenant or content provider (and corresponding origin server) concerned by the session request. For instance, the central controller CC 111 may retrieve an identifier representing the concerned origin server (such as an identifier of the tenant or content provider in question) by analysing an URI (Uniform Resource Identifier) path indicated in the session request or that may have been copied or quoted therefrom.

In a step 504, the central controller CC 111 checks whether the list L1 contains enough candidate caching platforms. For example, the central controller CC 111 checks whether the list L1 is not empty. According to another example, the central controller CC 111 checks whether the cardinality of the list L1 is greater than a predefined threshold TH_L1 in order to have enough choice possibilities among candidate caching platforms. When the list L1 contains enough candidate caching platforms, a step 505 is performed; otherwise, a step 506 is performed.

In the step 505, the central controller CC 111 selects a caching platform from the list L1. When plural caching platforms are present in the list L1, the central controller CC 111 applies predefined selection rules. The section rules may include load balancing rules and/or load sharing rules and/or energy consumption optimization rules and/or bandwidth consumption optimization rules (e.g., quantity of concurrent sessions simultaneously handled by a caching platform in view of available downlink bandwidth toward the terminals T 150 attached thereto). For example, the central controller CC 111 selects the less loaded caching platform in view of load information that have been obtained during execution of the algorithm of FIG. 4. The selection of the appropriate caching platform may be performed as function of one or more other criteria not depicted here. Then a step 510 is performed.

In the step 506, the central controller CC 111 lists, from the list L0, the caching platforms that exhibit a minimum burst transfer duration mTBDi, as stored according to the algorithm of FIG. 4, lower or equal to a predefined threshold TH that is a (integer) multiple of the chunk duration applicable to the delivery of the audio and/or video content in question. For example, the threshold TH is twice the chunk duration (e.g., 250 milliseconds). The central controller CC 111 thus forms a list L2 as a refined set of candidate caching platforms of the audio and/or video content delivery system 100, for delivering the audio and/or video content to the terminal T 150 in question.

In a step 507, the central controller CC 111 checks whether the list L2 contains enough candidate caching platforms. For example, the central controller CC 111 checks whether the list L2 is not empty. According to another example, the central controller CC 111 checks whether the cardinality of the list L2 is greater than the predefined threshold TH_L2 (that may be equal to TH_L1) in order to have enough choice possibilities among candidate caching platforms. When the list L2 contains enough candidate caching platforms, a step 508 is performed; otherwise, a step 509 is performed.

In the step 508, the central controller CC 111 selects a caching platform from the list L2. When plural caching platforms are present in the list L2, the central controller CC 111 applies predefined selection rules. The section rules may include load balancing rules and/or load sharing rules and/or energy consumption optimization rules and/or bandwidth consumption optimization rules (e.g. quantity of concurrent sessions simultaneously handled by a caching platform in view of available downlink bandwidth toward the terminals T 150 attached thereto). For example, the central controller CC 111 selects the less loaded caching platform in view of load information that have been obtained during execution of the algorithm of FIG. 4. The selection of the appropriate caching platform may be performed as function of one or more other criteria not depicted here. The selection rules applied in the step 508 may differ from the selection rules applied in the step 505. Then the step 510 is performed.

In the step 509, the central controller CC 111 selects a caching platform from the list L0. When plural caching platforms are present in the list L0, the central controller CC 111 applies predefined selection rules. The section rules may include load balancing rules and/or load sharing rules and/or energy consumption optimization rules and/or bandwidth consumption optimization rules (e.g. quantity of concurrent sessions simultaneously handled by a caching platform in view of available downlink bandwidth toward the terminals T 150 attached thereto). For example, the central controller CC 111 selects the less loaded caching platform in view of load information that have been obtained during execution of the algorithm of FIG. 4. The selection of the appropriate caching platform may be performed as function of one or more other criteria not depicted here. The selection rules applied in the step 510 may differ from the selection rules applied in the step 505 and/or in the step 508. Then the step 510 is performed.

Servers for delivering the audio and/or video content may be implemented in the caching platforms as virtual instances deployed in relatively small cloud infrastructure (also referred to as cloudlet). In this case, when the caching platform is selected, the central controller CC 111 may have to activate, or deploy/instantiate, a new server in the selected caching platform. Typically, the central controller CC 111 enforces a controller managing the cloudlet servers instantiation to do so. When such a server has been activated, the central controller CC 111 may enforce the audio and/or video content delivery system 100 to redirect one or more sessions for the audio and/or video content in question to another caching platform delivering said audio and/or video content (typically, to the newly activated cloudlet server) so as to perform load balancing or adequate load sharing with respect to predefined rules.

In the step 510, the central controller CC 111 redirects the terminal T 150 in question toward the selected caching platform so as to force the terminal T 150 to submit again the session request but now querying the selected caching platform. To do so, the central controller CC 111 transmits a redirection message (e.g., HTTP Redirect) to the terminal T 150 in question. Either the redirection message contains information enabling the terminal T 150 in question to determine to which selected caching platform to submit again the session request, or the central controller CC 111 enforces the network infrastructure (typically the breakout functions implemented therein) to ensure that new submission of the session request by the terminal T 150 in question reaches the selected caching platform.

Figure 6:
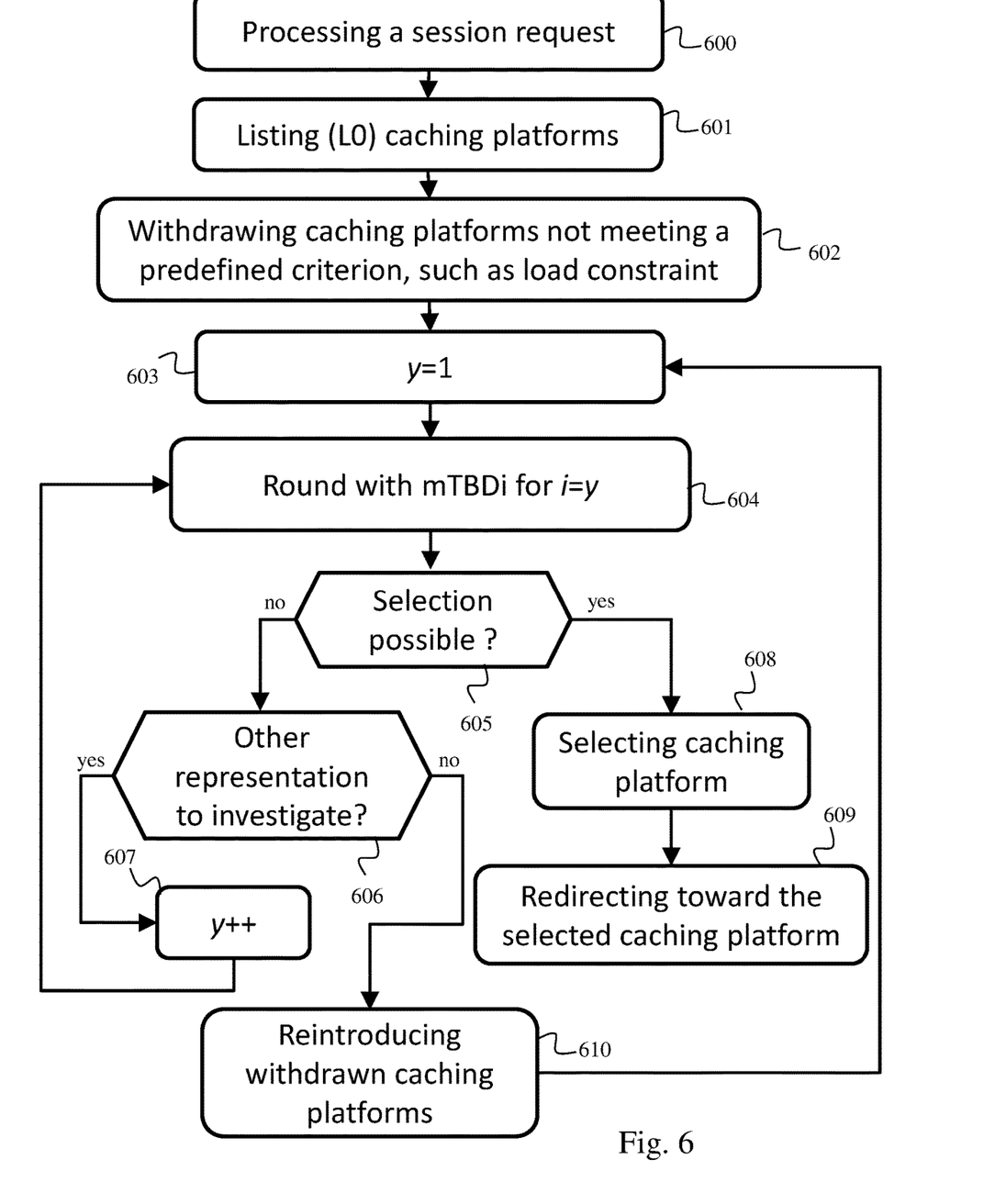
FIG. 6 schematically represents an algorithm for managing session requests in another embodiment.

FIG. 6 schematically represents an algorithm for managing session requests by the central controller CC 111 in another embodiment.

In a step 600, the central controller CC 111 processes a session request for a terminal T 150. As explained above, the session request is representative of a session to be setup with respect to said terminal T 150 so as to deliver an audio and/or video content. The step 600 is identical to the step 501.

In a step 601, the central controller CC 111 lists available caching platforms that are capable of delivering the audio and/or video content to the terminal T 150. The central controller CC 111 thus forms a list L0 as a set of candidate caching platforms of the audio and/or video content delivery system 100, for delivering the audio and/or video content to the terminal T 150 in question. The step 601 is identical to the step 502.

In a step 602, the central controller CC 111 withdraws from the list L0 caching platforms not meeting at least one predefined criterion, such as load constraint. The caching platforms exhibiting load information, as obtained when executing the algorithm of FIG. 4, below a predefined threshold (e.g., 80% of processing and/or memory resources) are considered as meeting the load constraint. Other criteria can be related to energy consumption and/or bandwidth consumption, or other, or combinations thereof.

In a step 603, the central controller CC 111 sets a parameter y to 1. The parameter y indicates a representation (i.e., quality) under consideration.

In a step 604, the central controller CC 111 performs a caching platform selection round by considering the minimum burst transfer duration mTBDi for i=y. The caching platform selection round corresponds to the steps 503 to 508 already described. In a step 605, the central controller CC 111 checks whether caching platform selection is possible (as in the steps 505 and 508). If this is the case, a step 608 is performed; otherwise (instead of performing the step 509), a step 606 is performed.

In a step 606, the central controller CC 111 checks whether one or more representation has to be investigated (i.e., when y≠N). When one or more representation has to be investigated, a step 607 is performed; otherwise, a step 610 is performed.

In the step 607, the central controller CC 111 increments the parameter y by one unit and the step 604 is repeated with the minimum burst transfer duration mTBDi for this newly selected representation.

In the step 608, the central controller CC 111 selects a caching platform, as in the steps 505 and 508 according to whichever is applicable, and in a step 609, the central controller CC 111 redirects the terminal T 150 in question toward the selected caching platform so as to force the terminal T 150 to submit again the session request but now querying the selected caching platform. The step 609 is identical to the step 510.

In the step 610, the central controller CC 111 reintroduces in the list L0 the caching platforms that have been withdrawn in the step 602, so as to enlarge the set of caching platforms (although, e.g., the reintroduced caching platforms may be highly loaded).

The invention claimed is:

1. A method for delivering an audio and/or video content to a terminal using adaptive streaming by an audio and/or video content delivery system deployed on top of a network infrastructure, the audio and/or video content delivery system comprising a controller and a plurality of caching platforms, the audio and/or video content being segmented into data segments available in various representations with respective audio and/or video qualities, the representations being time-aligned per segments further divided into chunks having same chunk duration with respect to the audio and/or video content, wherein the method comprises the following steps performed by the controller, for each caching platform:
obtaining a physical round-trip time information pertaining to the caching platform in question with respect to delivering audio and/or video contents by the caching platform in question to terminals via the network infrastructure;
computing a minimum burst transfer size mTBS from maximum average bitrate of the various representations of the audio and/or video content and from the obtained physical round-trip time information;
computing a minimum burst transfer duration mTBDi, for one or more representations i of the audio and/or video content, from the minimum burst transfer size mTBS;
and when the audio and/or video content has to be delivered to the terminal, the method comprises the following steps performed by the controller:
selecting, from a set L0 of candidate caching platforms, the caching platform to be used to deliver the audio and/or video content to the terminal, as a function of the minimum burst transfer duration mTBDi computed for one or more representations i of the audio and/or video content; and
redirecting the terminal to the selected platform for further delivery of the audio and/or video content in the form of bursts of chunks;
and wherein for selecting the caching platform to be used, the controller performs:
forming a list L1, from the set L0 of candidate caching platforms, containing the caching platforms that exhibit a minimum burst transfer duration mTBDi for one or more representations of the i of the audio and/or video content which is lower or equal to the chunk duration applicable to the delivery of the audio and/or video content in question, and when the list L1 has a cardinality above a predefined threshold, selecting the caching platform to be used from the list L1;
and otherwise forming a list L2, from the set L0 of candidate caching platforms, containing the caching platforms that exhibit a minimum burst transfer duration mTBDi lower or equal to a predefined threshold TH that is a multiple of the chunk duration applicable to the delivery of the audio and/or video content in question, and selecting the caching platform to be used from the list L2.

2. The method according to claim 1, wherein the physical round-trip time information represents maximum of minimum round-trip time incurred in past history when delivering an audio and/or video content to terminals and/or average of minimum round-trip time incurred in past history when delivering an audio and/or video content to terminals.

3. The method according to claim 1, wherein the controller computes, for each caching platform, the minimum burst transfer duration mTBDi only for the lowest bitrate representation available for the one or more audio and/or video contents, namely for i=1.

4. The method according to claim 1, wherein the controller selects the caching platform to be used to deliver the audio and/or video content to the terminal when processing a session request concerning the terminal in question and the audio and/or video content in question.

5. The method according to claim 4, wherein the chunk duration, as well as available representations of the audio and/or video content, depend on an origin server providing the audio and/or video content concerned by the session request, and the controller retrieves an identifier representing the origin server in question by analysing a Uniform Resource Identifier path indicated in the session request, or copied or quoted therefrom.

6. The method according to claim 1, wherein the controller defines said set L0 of candidate caching platforms as being the caching platforms of the audio and/or video content delivery system which are deployed or which can be activated in a predetermined geographical area.

7. The method according to claim 6, wherein the network infrastructure is a mobile network infrastructure, and the geographical area is determined as being a part of the network infrastructure upstream a predetermined set of mobile network cells surrounding the terminal.

8. The method according to claim 1, wherein when the list L2 has a cardinality lower or equal to a predefined threshold, the controller selects the caching platform to be used from the list L0.

9. The method according to claim 1, wherein the controller performs:
withdrawing from the list L0 caching platforms not meeting at least one predefined criterion;
selecting the lowest representation, designated here with a parameter y=1;
performing a caching platform selection round by considering the minimum burst transfer duration mTBDi for i=y by forming the list L1 and potentially the list L2;
and when no selection results from the lists L1 and L2, the parameter y is incremented by one unit and the controller performs another caching platform selection round with the minimum burst transfer duration mTBDi for the representation designated by the parameter y.

10. The method according to claim 1, wherein the controller redirects the terminal toward the selected caching platform by forcing the terminal to submit again a session request but by querying the selected caching platform instead of querying the controller.

11. The method according to claim 1, wherein the network infrastructure is a mobile network infrastructure and the caching platforms are deployed in cloudlets of the mobile network infrastructure.

12. A nontransitory information storage medium storing a computer program product comprising instructions causing implementation of the method according to claim 1, when the instructions are executed by a processor.

13. A controller intended for being used in an audio and/or video content delivery system deployed on top of a network infrastructure, the audio and/or video content delivery system further comprising a plurality of caching platforms for delivering an audio and/or video content via the network infrastructure, the audio and/or video content being segmented into data segments available in various representations with respective audio and/or video qualities, the representations being time-aligned per segments further divided into chunks having same chunk duration with respect to the audio and/or video content, wherein the controller comprises electronic circuitry configured for, for each caching platform:
   obtaining a physical round-trip time information pertaining to the caching platform in question with respect to delivering audio and/or video contents by the caching platform in question to terminals via the network infrastructure;
   computing a minimum burst transfer size mTBS from a maximum average bitrate of the various representations of the audio and/or video content and from the obtained physical round-trip time information;
   computing a minimum burst transfer duration mTBDi, for one or more representations i of the audio and/or video content, from the minimum burst transfer size mTBS;
   and, the electronic circuitry is further configured, when the audio and/or video content has to be delivered to the terminal, for:
      selecting, from a set L0 of candidate caching platforms, the caching platform to be used to deliver the audio and/or video content to the terminal, as a function of the minimum burst transfer duration mTBDi computed for one or more representations i of the audio and/or video content; and
      redirecting the terminal to the selected platform for further delivery of the audio and/or video content in the form of bursts of chunks;
   and wherein the electronic circuitry is further configured, so as to select the caching platform to be used, for:
      forming a list L1, from the set L0 of candidate caching platforms, containing the caching platforms that exhibit a minimum burst transfer duration mTBDi for one or more representations i of the audio and/or video content which is lower or equal to the chunk duration applicable to the delivery of the audio and/or video content in question, and when the list L1 has a cardinality above a predefined threshold, selecting the caching platform to be used from the list L1;
      and otherwise forming a list L2, from the set L0 of candidate caching platforms, containing the caching platforms that exhibit a minimum burst transfer duration mTBDi lower or equal to a predefined threshold TH that is a multiple of the chunk duration applicable to the delivery of the audio and/or video content in question, and selecting the caching platform to be used from the list L2.

14. A Content Delivery Network CDN comprising a controller according to claim 13.

* * * * *